(12) United States Patent
Adomeit et al.

(10) Patent No.: US 6,467,799 B2
(45) Date of Patent: Oct. 22, 2002

(54) AIRBAG MODULE AND AIRBAG THEREOF, AND METHOD OF MOUNTING THE AIRBAG

(75) Inventors: Heinz-Dieter Adomeit; Carsten Haase, both of Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/915,399

(22) Filed: Jul. 27, 2001

(65) Prior Publication Data

US 2001/0052689 A1 Dec. 20, 2001

Related U.S. Application Data

(63) Continuation of application No. PCT/DE00/00226, filed on Jan. 21, 2000.

(51) Int. Cl.⁷ .............................................. B60R 21/16

(52) U.S. Cl. ................................... 280/728.2; 280/731

(58) Field of Search ........................... 280/728.2, 728.3, 280/731, 732, 743.1; 74/552

(56) References Cited

U.S. PATENT DOCUMENTS

| | | | |
|---|---|---|---|
| 4,004,827 A | | 1/1977 | Kondo et al. |
| 5,062,664 A | * | 11/1991 | Bishop et al. ............ 280/728.2 |
| 5,094,476 A | * | 3/1992 | Chihaya ................... 280/743.1 |
| 5,549,326 A | * | 8/1996 | Rodriguez Ramos .... 280/743.1 |
| 5,560,648 A | | 10/1996 | Rhule et al. |
| 5,575,497 A | | 11/1996 | Suyama et al. |
| 5,577,765 A | | 11/1996 | Takeda et al. |
| 5,632,506 A | * | 5/1997 | Shellabarger ............ 280/731.1 |
| 5,642,900 A | | 7/1997 | Patel |
| 5,697,637 A | * | 12/1997 | Milne, III ................ 280/728.2 |
| 5,746,447 A | | 5/1998 | Dyer et al. |

(List continued on next page.)

FOREIGN PATENT DOCUMENTS

| | | |
|---|---|---|
| DE | 2 248 393 | 4/1973 |
| DE | 91 01 099 | 7/1992 |
| DE | 42 35 761 C2 | 4/1994 |
| DE | 94 05 143 | 6/1994 |
| DE | 195 05 507 A1 | 2/1995 |
| DE | 295 21 369 U1 | 3/1997 |
| DE | 296 16 916 U1 | 3/1997 |
| DE | 195 38 594 A1 | 4/1997 |
| DE | 296 20 298 U1 | 4/1997 |
| DE | 196 24 371 A1 | 1/1998 |
| DE | 297 13 111 U1 | 3/1998 |
| DE | 297 13 112 U1 | 3/1998 |
| DE | 197 52 629 A1 | 7/1998 |
| EP | 0 622 276 A1 | 11/1994 |
| EP | 0 681 946 A1 | 11/1995 |
| EP | 0 832 791 A2 | 4/1998 |
| EP | 0 861 762 A1 | 9/1998 |
| JP | 03292236 | 10/1990 |

Primary Examiner—Paul N. Dickson
Assistant Examiner—David R. Dunn
(74) Attorney, Agent, or Firm—Foley & Lardner

(57) ABSTRACT

An airbag module and method of mounting an airbag to the module. The module has an airbag, a gas generator, and a housing containing the airbag and the gas generator. The housing has a single-piece construction, including a container-shaped cover and a generator support foldably mounted to the cover. The airbag has a slot for inserting the gas generator, and a plurality of passages for passage of fasteners, which can be premounted to the gas generator. The slot forms two mount zones that can overlap. The airbag is folded into the cover or folded airbag can be placed into the cover. Thereafter, the gas generator is inserted into the airbag through the slot. The fasteners are inserted through the passages one at a time so that the mount zones overlap. The generator support is then folded over the cover, with the fasteners extending through the support via appropriate openings formed therethrough. The airbag module now can be seated and secured to a steering wheel using the fasteners and nuts.

24 Claims, 10 Drawing Sheets

U.S. PATENT DOCUMENTS

| | | |
|---|---|---|
| 5,779,261 A | 7/1998 | Honda |
| 5,797,622 A | 8/1998 | Turner et al. |
| 5,806,882 A * | 9/1998 | Stein et al. ............... 280/730.2 |
| 5,810,390 A * | 9/1998 | Enders et al. ............ 280/730.2 |
| 5,906,389 A | 5/1999 | Fischer |
| 5,997,036 A | 12/1999 | Hamada |
| 6,039,341 A * | 3/2000 | Doxey et al. ............. 280/728.2 |
| 6,126,195 A * | 10/2000 | Lutz ........................... 280/737 |
| 6,312,007 B1 * | 11/2001 | Paule et al. .............. 280/728.1 |

* cited by examiner

AIRBAG MODULE AND AIRBAG THEREOF, AND METHOD OF MOUNTING THE AIRBAG

This is a continuation of International Application PCT/DE00/00226, with an international filing date of Jan. 21, 2000; this international application was not published in English, but in German, as WO 00/44592.

BACKGROUND

Airbag modules with airbags or gas bags effectively protect motor-vehicle occupants during a collision. During a collision, a gas generator releases pressurized gas into the airbag to inflate the same (which is typically located in a steering wheel, dashboard, side door, or seat) within a short time. In addition to the airbag and the gas generator, the airbag module also contains a number of other components, such as a housing containing or housing the airbag in a folded state, a cover for the housing, and a gas generator support for holding the gas generator. Additional components, such as retaining rings are also used to fasten the airbag.

U.S. Pat. No. 5,797,622 discloses an airbag module having a two-part housing mounted on a steering wheel. The housing has a housing lower part, which is formed integrally on the steering wheel, and an upper part serving as the cover, with a hollow-cylindrical holding device fastened to the upper part for holding a cylindrical gas generator. The folded airbag is placed over the outer surface of the holding device.

European patent publication EP 0 622 276 A1 discloses an airbag restraint system for vehicles. Here, a preassembled airbag is fastened to a securing plate and then is inserted together with the securing plate into the interior of a cover of the restraint system. The cover is assigned, as a lower part, a generator support in the form of a supporting plate on which a gas generator is secured.

To save costs and to simplify the installation of the airbag module and the mounting to a part of the motor vehicle, it is desirable to reduce the number of the individual parts of an airbag module. In this respect, European patent publication EP 0 832 791 A2 describes an airbag module for a vehicle-occupant restraint system having an airbag, a gas generator, and installation screws having a fastening extension that projects away from the airbag module for fastening the gas-bag module to a vehicle part. The screws have a locating head. The edge of the blow-in opening of the airbag is clamped between the locating head and a nut screwed onto the stem of the installation screw. Furthermore, a retaining ring is positioned in the interior of the airbag and an installation plate is provided for the gas generator. The blow-in opening edge is sandwiched between the retaining ring and the installation plate. This module has a cover with a downwardly extending side walls that extend to the screws, which hold the cover. This design reduces the number of components. Nonetheless, to securely fasten the airbag to the gas generator, this airbag module requires, in addition to the housing cover, further components are needed, namely the installation plate on the gas generator and the retaining ring.

There is still a need to further reduce the number of airbag module components. The present invention addresses this need.

SUMMARY OF THE INVENTION

The present invention relates to an airbag module, an airbag thereof, and a method of mounting the airbag to the module.

One aspect of the present invention relates to an airbag, which can include an airbag mount for mounting the gas generator to the airbag. The mount can include a slot for inserting the gas generator into the airbag, and a plurality of passages for receiving fasteners for securing the airbag module. The slot can form at least two mounting zones, where the passages are located. The mounting zones can be configured to partially overlap when the fasteners are inserted through the passages.

The airbag mount can further include a cutout for passage of an ignition cable. The cutout can be formed between the overlapping zones. The slot can form an even number of the mounting zones, and can be cross shaped for forming four mount zones. Each zone can have one of the passages, which can be punched holes, each with a reinforced edge.

Another aspect of the present invention relates to an airbag module, which can include the airbag described above. The module can include a single-piece housing having a cover and a generator support, the airbag, which is folded and positioned inside the housing, and a gas generator connected to the generator support. The generator support can be foldably or pivotally connected to the cover.

Part of the gas generator can rest on the generator support, which can be hingedly connected to the cover. Specifically, the support can be hinged to the cover using at least one film hinge. The generator support can comprise at least one foldable tab hingedly connected to the cover. The entire housing can be made of plastic, in particular by injection molding.

The generator support can comprise one to four tabs. For two ore more tabs, they can be configured to partially overlap each other. The housing can include latches for securing the tabs to the cover.

The gas generator can include a flange for securing the gas generator to the generator support. The flange can further include fasteners for connecting the airbag module to a steering wheel, or any other part of a vehicle. The fasteners can be threaded bolts for example.

The airbag can be fixed directly to the gas generator, for instance, by sandwiching the airbag between the generator support and the gas generator.

Another aspect of the present invention relates to a method of mounting the airbag of the airbag module. The method can comprise providing the airbag with the slot, which forms at least two mounting zones, and the passages in the two mounting zones, providing the single-piece housing having the cover and the generator support foldably connected to the cover. The generator support can have openings for passage of the fasteners. The method can further include positioning the folded airbag inside the cover, providing the gas generator with the fasteners, and inserting the gas generator into the airbag through the slot. The method can further include inserting the fasteners through the passages and partially overlapping the two mounting zones, and folding the generator support onto the gas generator positioned inside the cover and inserting the fasteners through the openings.

BRIEF DESCRIPTION OF THE DRAWINGS

FIG. 3b shows a bottom view of the airbag module of FIG. 3a.

FIG. 4b shows a bottom view of the airbag module of FIG. 4a.

FIG. 5b shows a bottom view of the airbag module of FIG. 5a.

DETAILED DESCRIPTION

Figure 1:
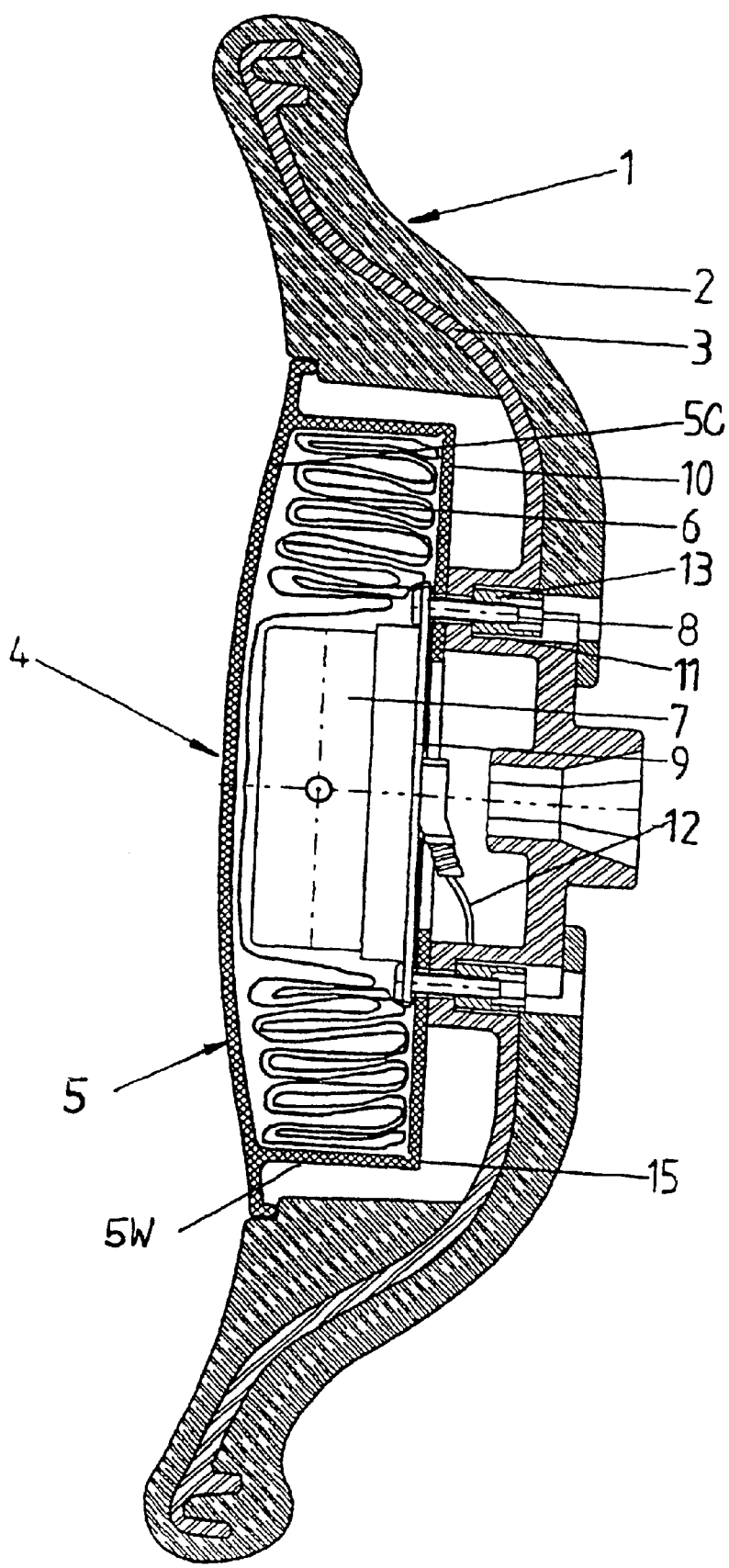
FIG. 1 shows a cross section of an airbag module according to the present invention mounted to a steering wheel.

FIG. 1 shows a cross-sectional view of the present airbag module 4 mounted to a steering wheel 1, which has a steering-wheel rim 2 and a steering-wheel hub 3. The airbag module 4 includes a housing 5, an airbag 6, and a gas generator 7. The housing 5 can be a single piece, having a cover portion 5C integrally formed with a base portion 10, which supports the gas generator 7. The cover 5C encloses both the airbag 6 and gas generator 7. In this regard, the cover 5C can be container shaped, having sidewalls 5W that can surround the airbag 6 stored therein.

The generator 7 includes a flange 9 having an opening through which fasteners 8 can secure the generator 7 to the housing. In this regard, the fasteners 8, such as threaded bolts, each can have a threaded end for receiving a nut 13. The base or generator support 10 for supporting the generator 7 thereon can be secured to the steering-wheel hub 3 using the fasteners 8. In this regard, the base 10 can have holes for passing the fasteners 8 therethrough. The hub 3 can have complementary openings 11 that are alignable with the holes in the base 10 for passing the fasteners 8. After the fasteners are inserted through the aligned holes and openings in the flange 9, airbag 6, base 10, and hub 3, nuts 13 can engage the threaded portions to secure the airbag module 4 to the steering-wheel hub 3.

Furthermore, the base 10 can have an opening or cutout 18 underneath the generator 7, through which an ignition cable 12 can connect to the generator 7. The ignition cable 12 can be connected to the generator 7 via a connecting plug for igniting the generator 7.

Both the airbag module packaging and the mounting (to the steering wheel 1) processes are considerably simplified by the present one-piece housing configuration, which integrates the cover 5C and the generator support 10. This significantly reduces the number of components needed. The airbag module 4 essentially has three components, the housing 5, the airbag 6, and the gas generator 7. The flange 9 and the fasteners 8 can be integral with the generator 7, or at least pre-fitted thereto. The module 4 can therefore be easily pre-assembled or pre-packaged.

Installing the airbag module 4 is made very simple by the present invention. The airbag module 4, which has the folded airbag 4, the generator 7, and the fasteners, is pre-assembled into the housing 5. To fasten the module 4 to the steering wheel 1, the threaded bolts 8 are aligned and inserted into the holes 11 in the hub 3. Thereafter the nuts 13 are screwed to the threaded end of the fasteners 8. The ignition cable 12 generally has a plug that is connected to the airbag module 4. The plug can be attached through the cutout 18 (and cutout 18A in the airbag—see FIGS. 9–10c).

Figure 2:
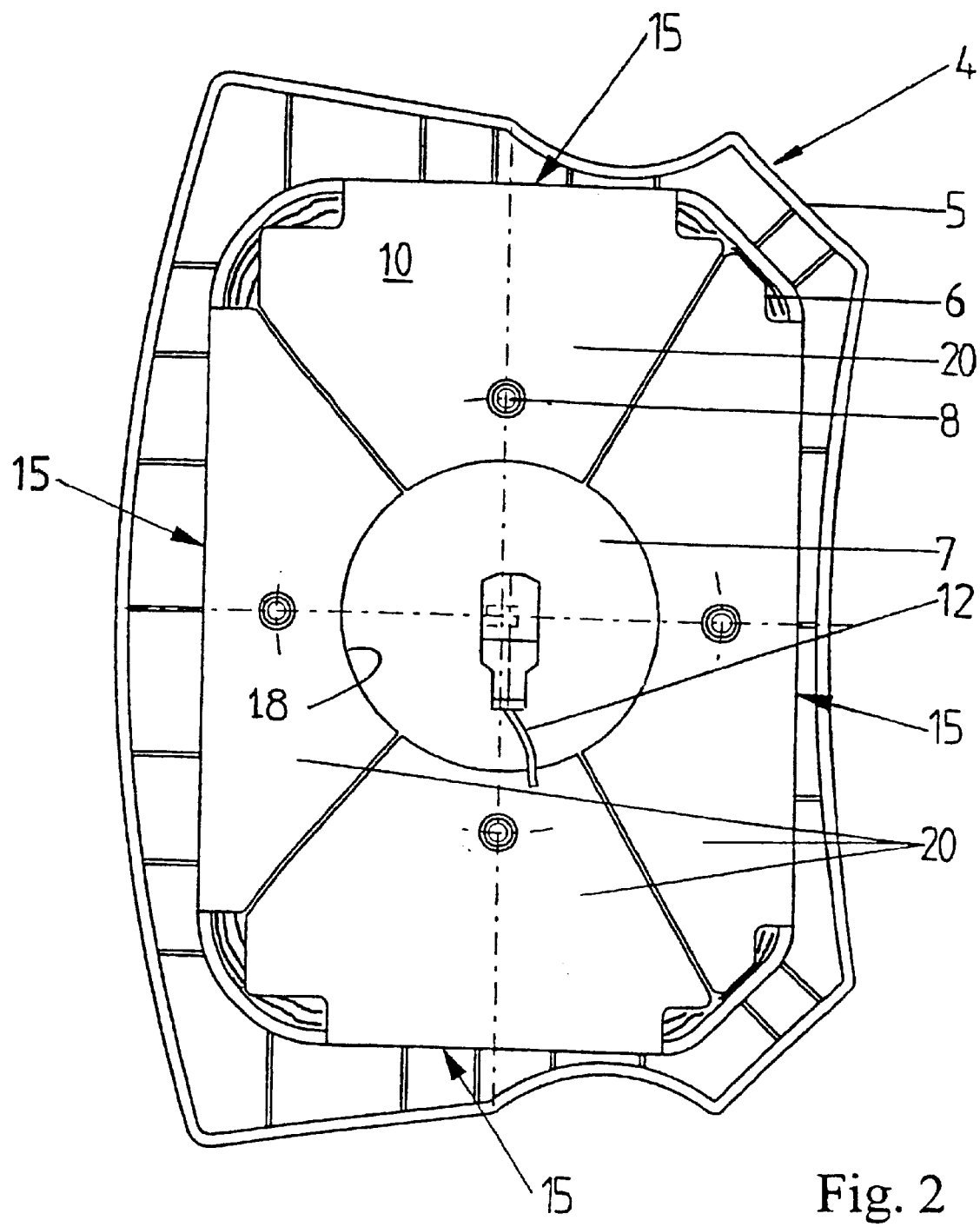
FIG. 2 shows a bottom view of the airbag module of FIG. 1.

FIG. 2 illustrates the bottom view of the airbag module of FIG. 1. It can be seen that the generator support 10 has four tabs 20, which can be pivotally or foldably attached to the cover 5C. Hinges 15, such as a film hinge type, can be used for that purpose. Furthermore, FIG. 2 illustrates four threaded fasteners 8 protruding through the generator support 10, and the cutout 18 for the ignition cable 12. The shape of the housing 5 can be configured to the steering wheel shape, e.g., four-spoke, three-spoke.

Figure 3A:
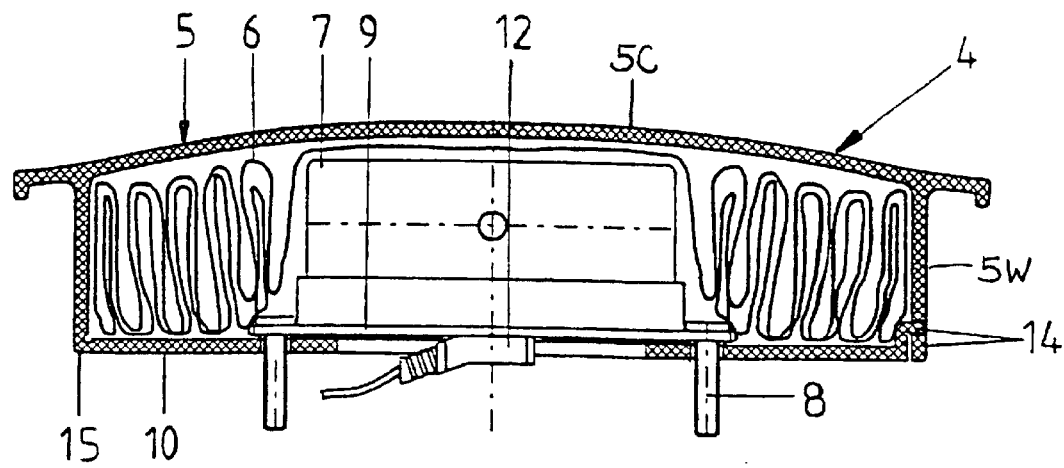
FIG. 3a is a view similar to FIG. 1, but showing another embodiment of an airbag module according to the present invention.
Figure 3B:
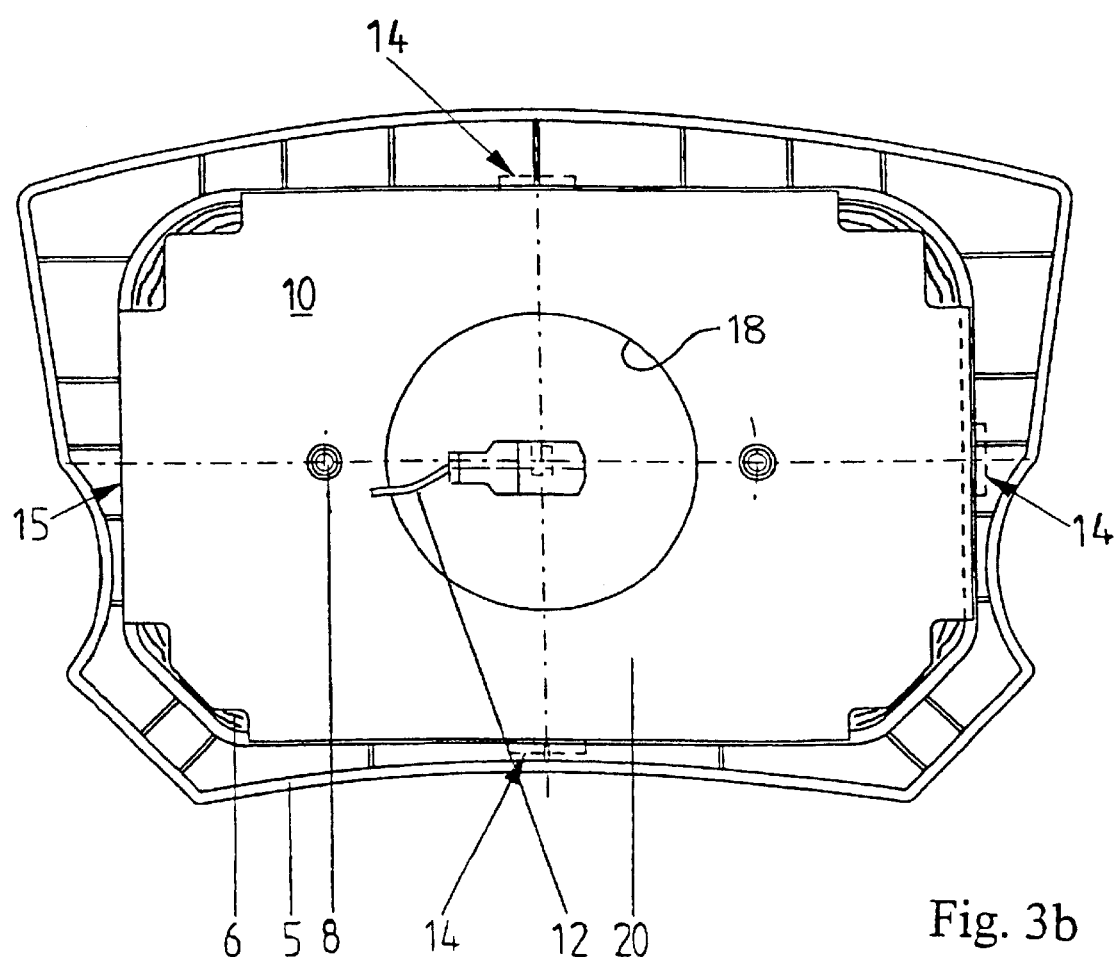

FIG. 3a shows a cross-section of another embodiment of an airbag module 4 according to the present invention. The construction corresponds essentially to that of FIG. 1, but with a single, hinged tab 20 forming the generator support 10. The tab 20 is hinged to the cover wall 5W only on one side via a film hinge 15 (see FIG. 3b) and other side secured to the cover wall 5W via a latch 14. As with the embodiment of FIG. 1, the final fixing of the gas generator 7 to the housing 5 happens when the airbag module 4 is mounted and secured to the steering wheel. FIG. 3b shows the bottom view of the airbag module 4 of FIG. 3a. It can be seen that the shape of the housing 5 can be configured for a particular steering wheel.

After the airbag 6 is folded into the cover SC, the generator support 10, with the gas generator 7, can be folded over and secured to the cover 5C with the latch 14. The fasteners 8, which can be threaded bolts, protrude through corresponding openings in the generator support 10. Similarly, a cutout 18 is provided for the ignition cable 12, as is with the embodiment of FIG. 1.

Figure 4A:
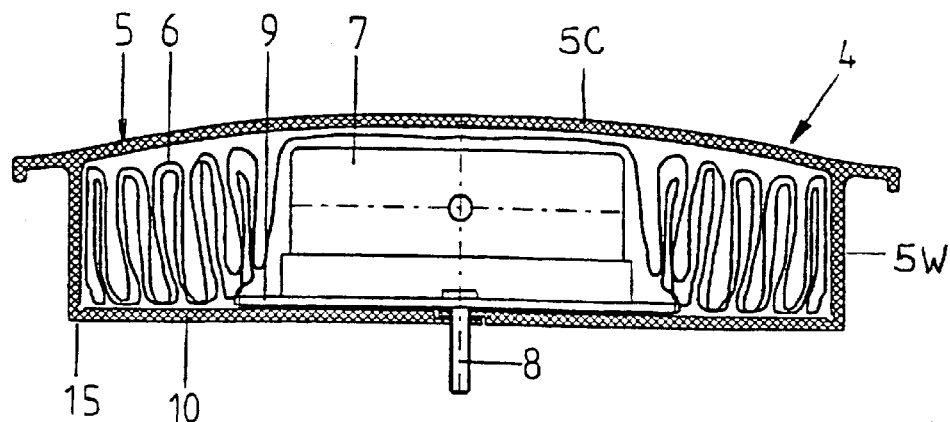
FIG. 4a is a view similar to FIGS. 1 and 3a, but showing yet another embodiment of an airbag module, which is configured for a four-spoke steering wheel.
Figure 4B:
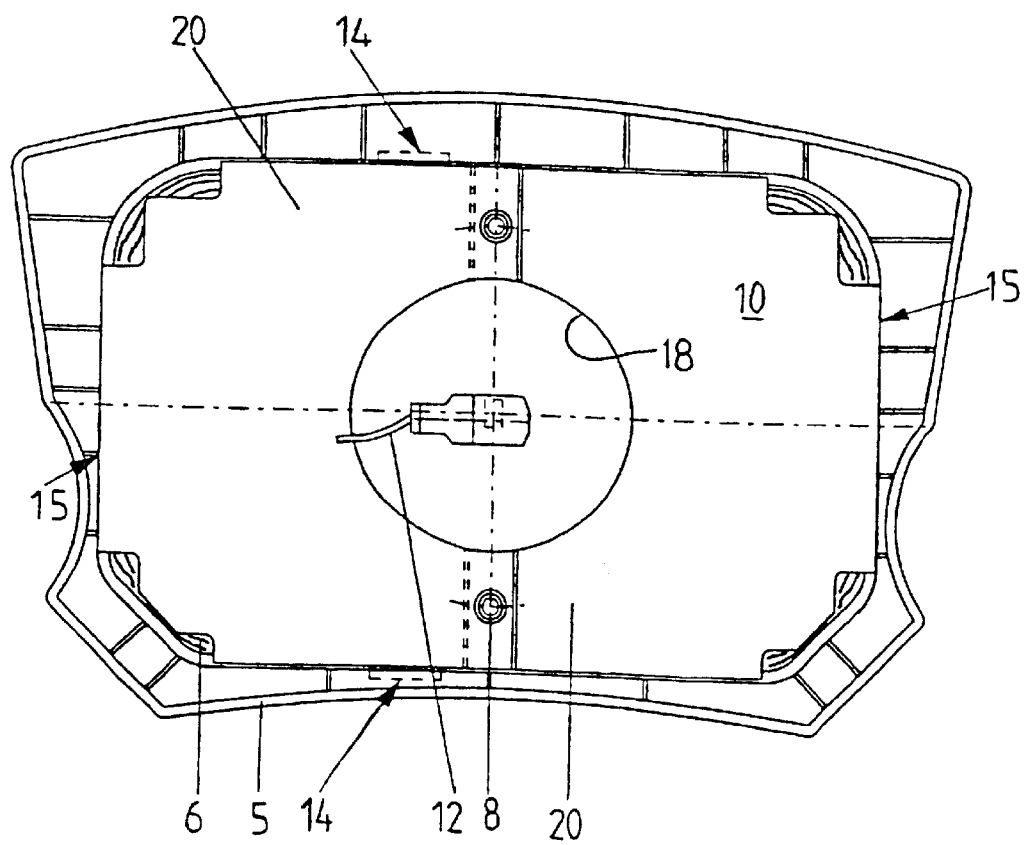

FIGS. 4a and 4b illustrate another embodiment of an airbag module 4 according to the present invention. Here, two overlapping tabs 20 (hinged via the film hinges 15 to the cover wall 5W) form the generator support 10. The overlapping provides a secure and tight fixing of the airbag 6 between the gas generator 7 and the support 10.

Figure 5A:
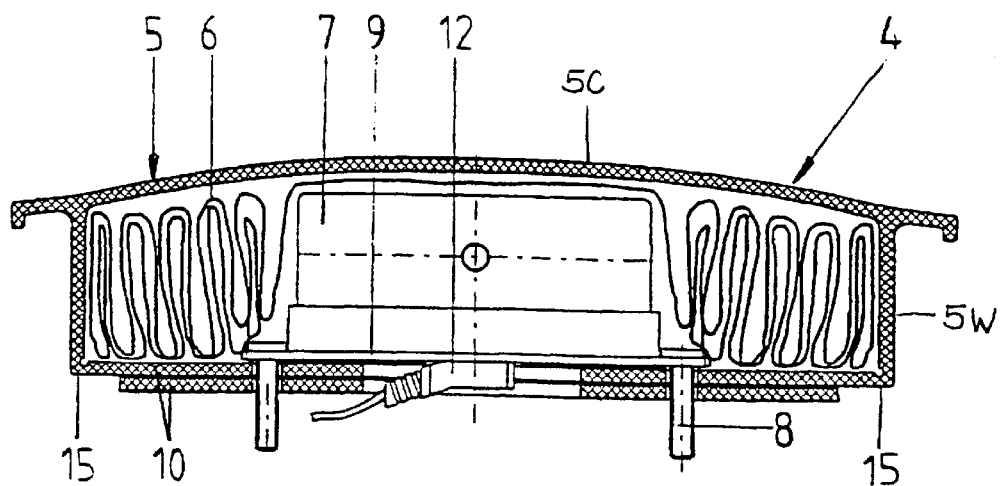
FIG. 5a is a view similar to FIG. 4a, but showing yet another embodiment of an airbag module, which is also configured for a four-spoke steering wheel.
Figure 5B:
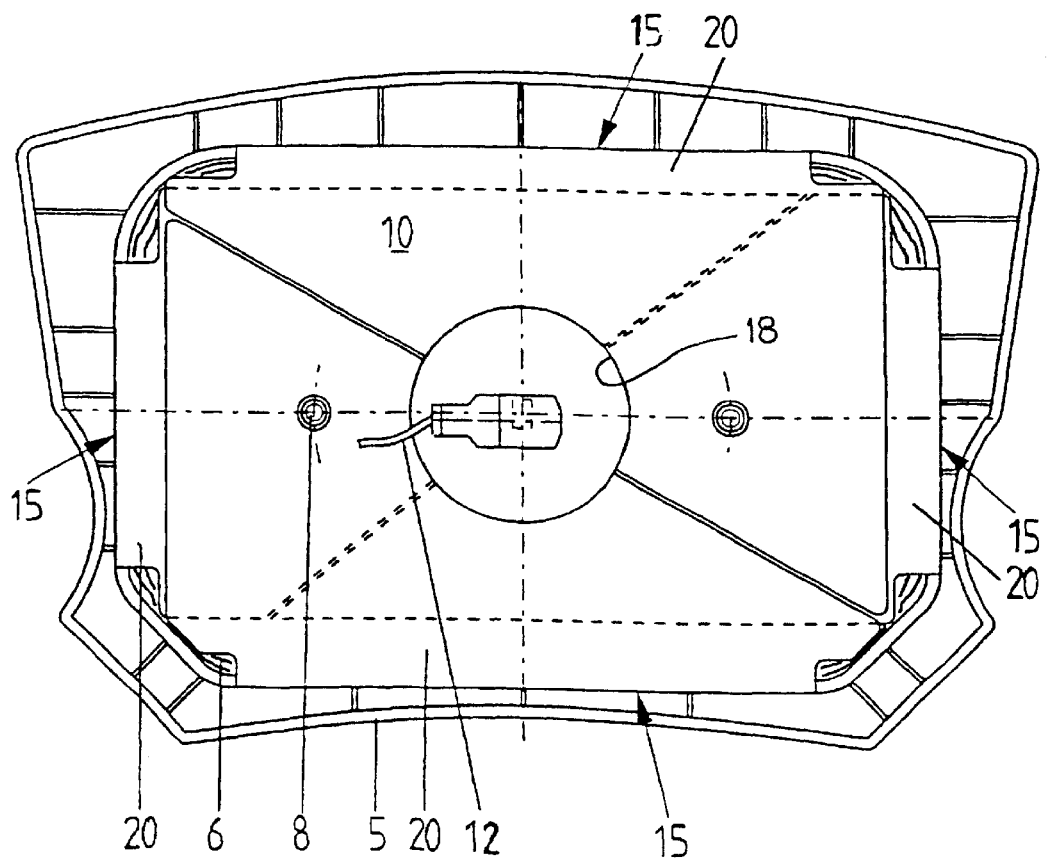

FIGS. 5a and 5b show another embodiment of an airbag module 4 according to the present invention. In this embodiment, four completely overlapping, foldable tabs 20 form the lower region 10 so that latches can be dispensed with. Each foldable tab 20 can be hinged to the cover wall 5W via a film hinge 15.

Figure 6:
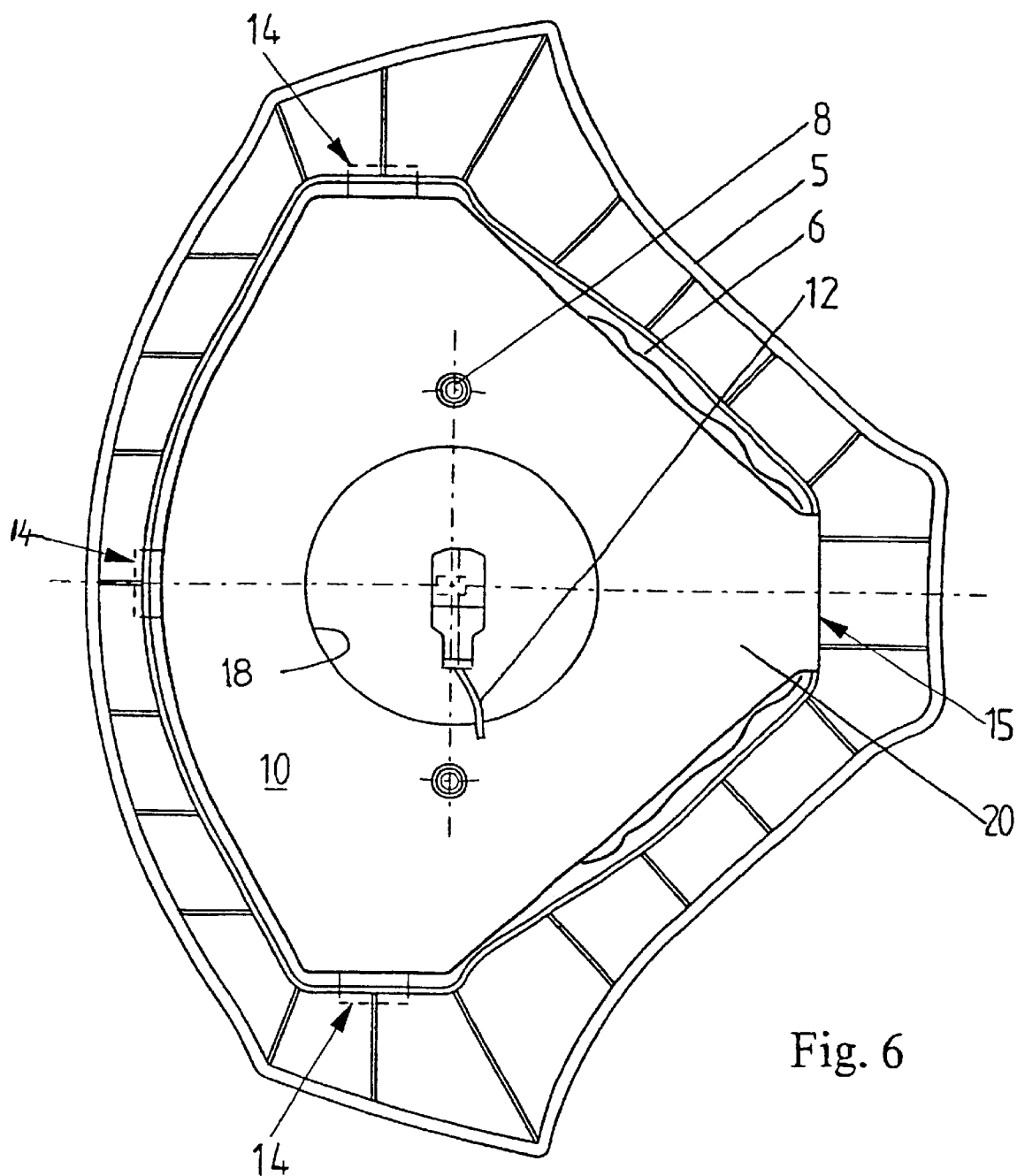
FIG. 6 shows a bottom view of another embodiment of an airbag module, which is configured for a three-spoke steering wheel.

FIG. 6 shows a bottom view of an airbag module for a three-spoke steering wheel. In this embodiment, the lower region or the generator support 10 can be a single tab, which can be hinged 15 to the cover wall 5W on one side and secured thereto with latches 14 on the other two sides.

Figure 7:
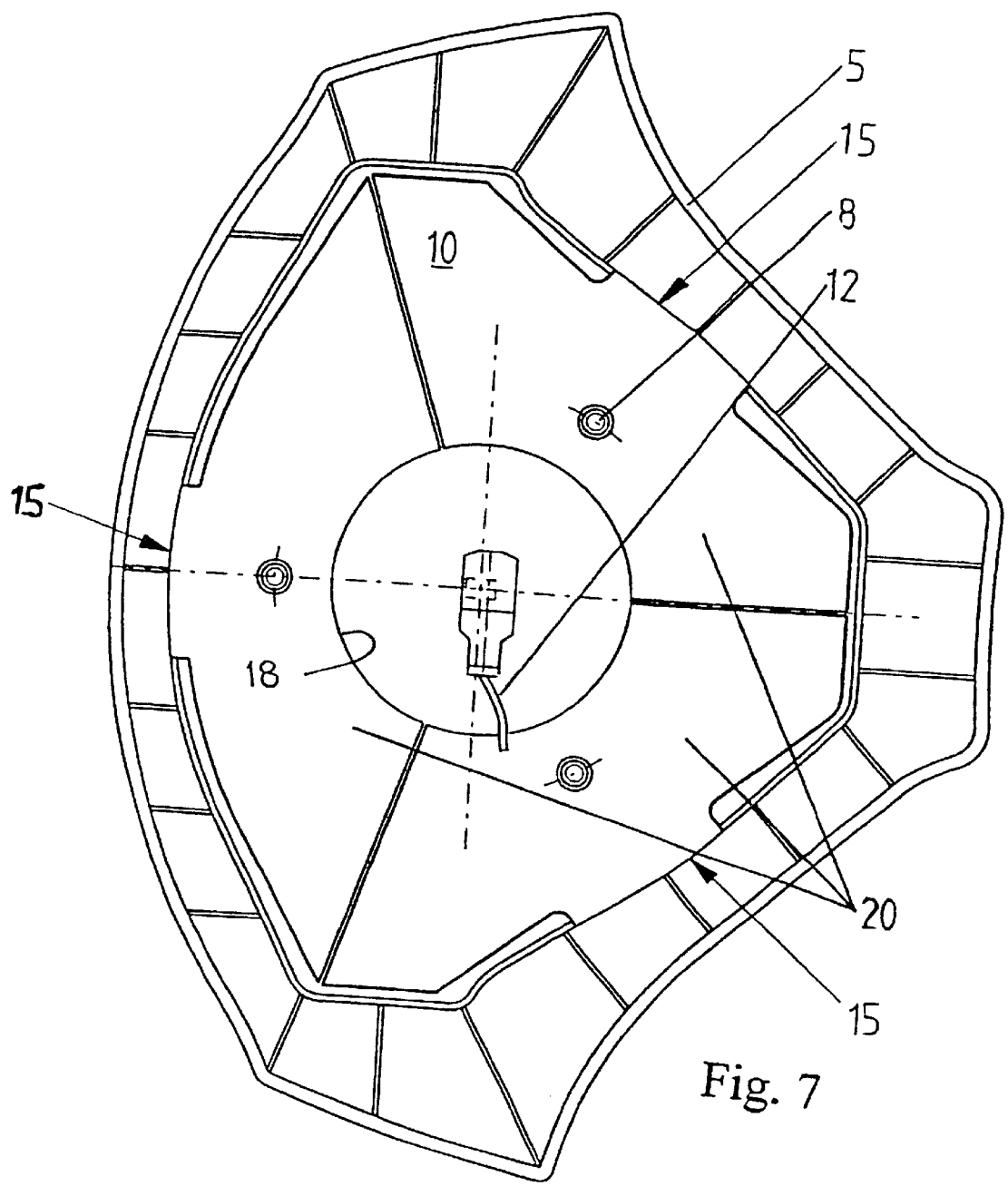
FIG. 7 is a view similar to FIG. 6, but showing another embodiment of an airbag module, which has three tabs for a three-spoke steering wheel.

FIG. 7 shows a bottom view similar to FIG. 6, but with three tabs 20 (hinged to the cover wall 5W via the film hinges 15) forming the generator support 10, and with three threaded bolts 8 correspondingly provided as the fasteners.

Figure 8:
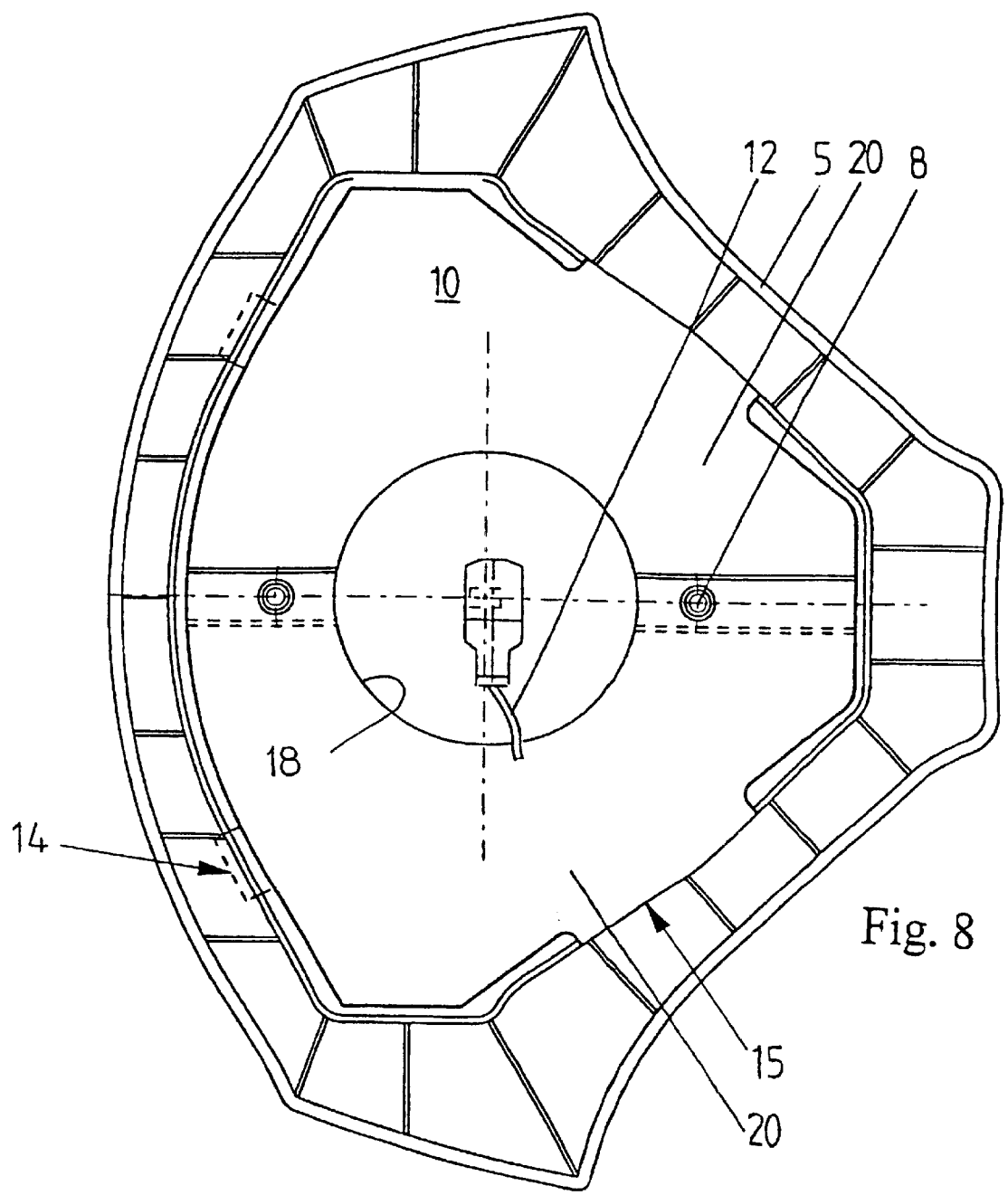
FIG. 8 is a view similar to FIG. 7, but showing another embodiment of an airbag module, which has two overlapping tabs.

FIG. 8 shows a bottom view similar to FIGS. 6 and 7, but with two overlapping tabs 20 forming the generator support 10. Each of the tabs 20 is hinged to the cover wall 5W via a hinge 15. Furthermore, both tabs 20 can be latched to the cover wall 5W via latches 14.

Figure 9:
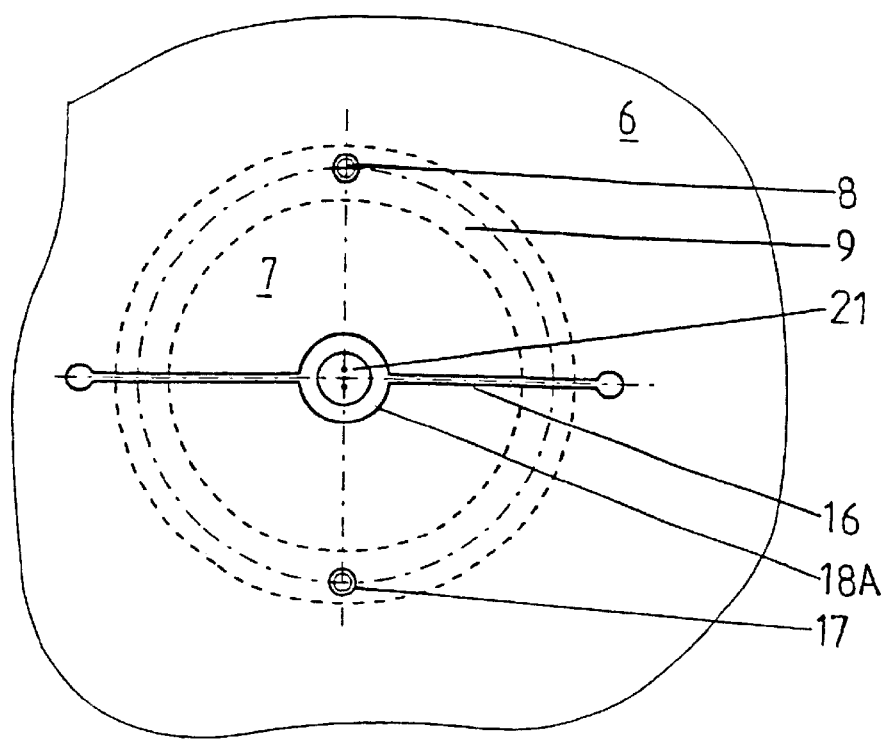
FIG. 9 shows an airbag according to the present invention having a slot for inserting a gas generator into the airbag.

FIG. 9 illustrates part of the airbag 6 (unfolded state) through which the gas generator 7 is inserted thereinto. The airbag 6 has a single slot 16 (in this embodiment) for inserting the gas generator 7 and passages 17 for the fasteners 8 extending from the flange 9 of the gas generator 7. The passages 17, which can be formed by punched holes, can have reinforced edges. Furthermore, the airbag 6 has a cutout 18A for allowing the ignition cable 12 to connect to the gas generator connection 21.

Figure 10A:
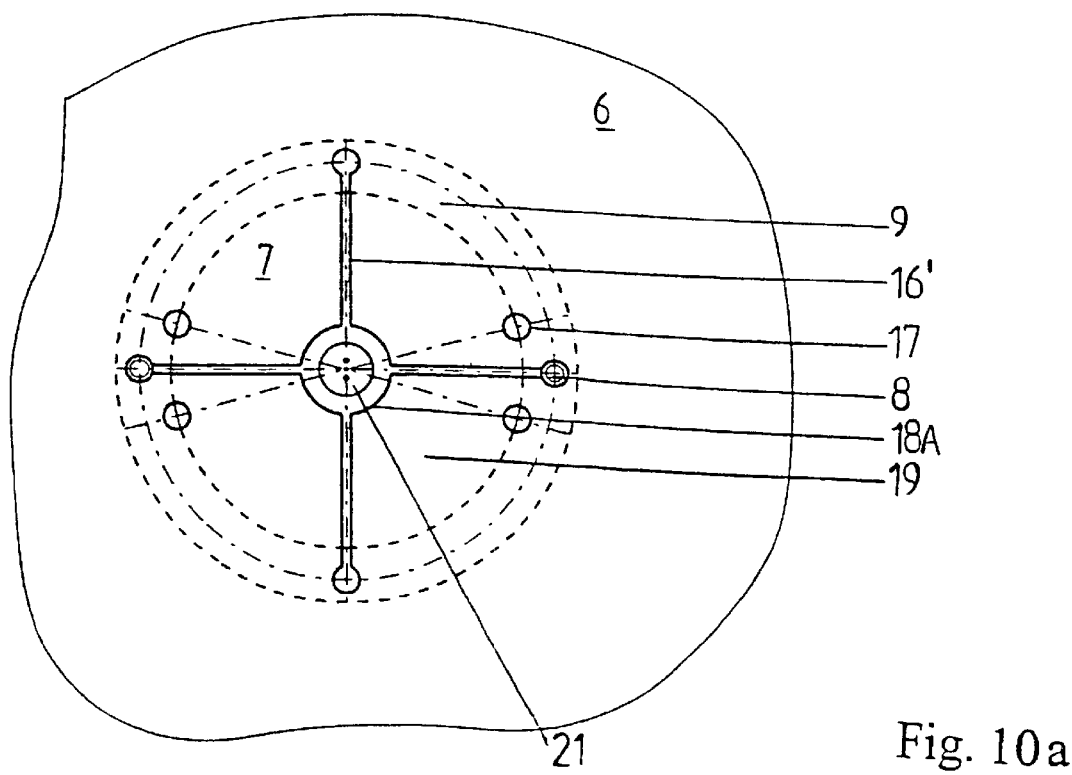
FIG. 10a shows another embodiment of an airbag according to the present invention, but with cross-shaped slots, which forms four mounting zones in the airbag, for inserting a gas generator into the airbag.

FIG. 10a shows another embodiment of the airbag 6. Again, only part of the airbag 6 and the gas generator 7 are illustrated. In this embodiment, the airbag 6 has a cross-shaped slot 16' for inserting the gas generator 7. In addition, a passage 17 into which a threaded bolt 8 can be inserted can be provided in each sector or zone 19 formed by the slot 16'.

Figure 10B:
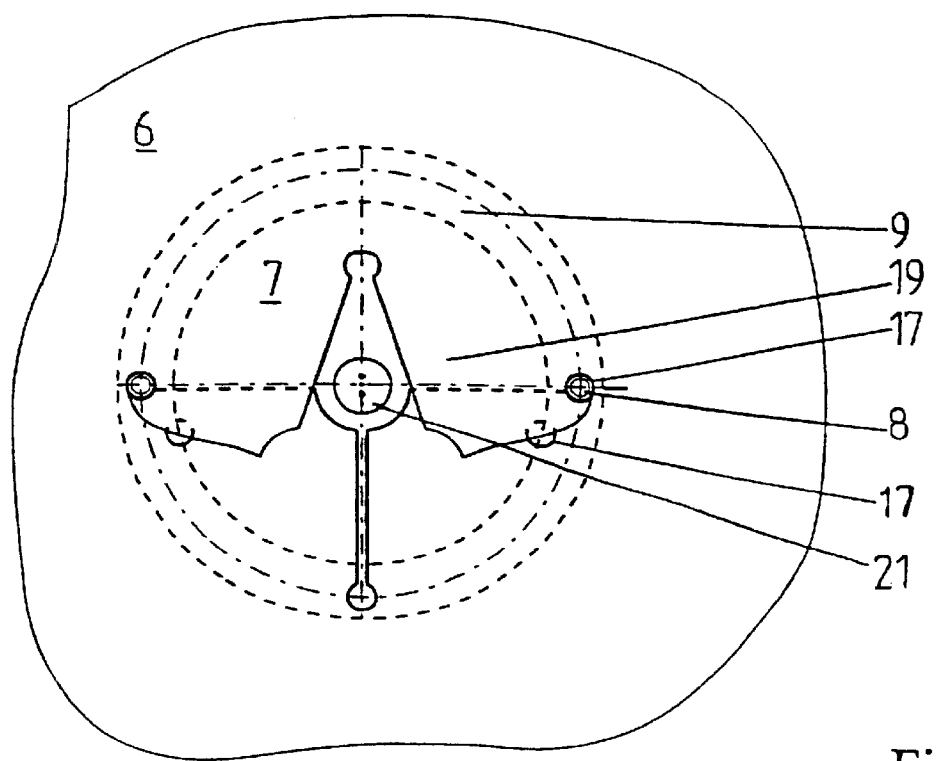
FIG. 10b shows the airbag of FIG. 10a, having the fasteners inserted through the first two adjacent zones.
Figure 10C:
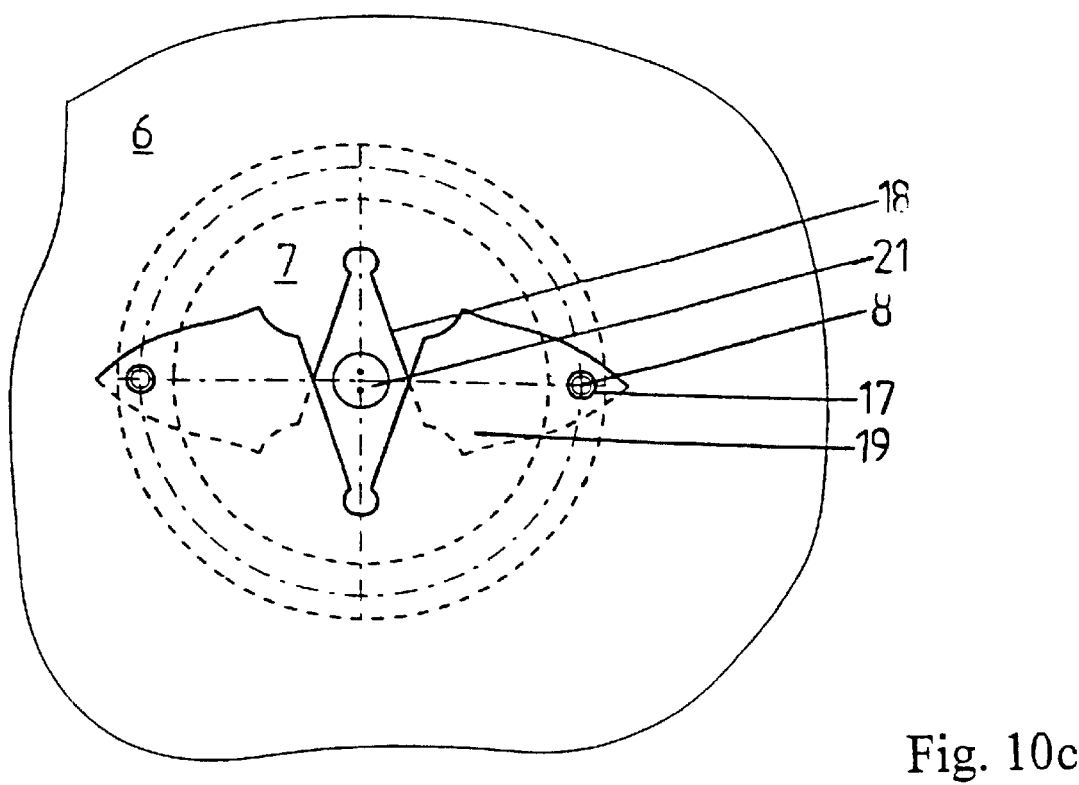
FIG. 10c shows the airbag of FIGS. 10a and 10b, having fasteners inserted through the other two adjacent zones.

FIG. 10b shows (after the gas generator 7 has been inserted into the airbag 6) a first pair of adjacent zones 19 being stretched after the fasteners 8 are inserted into the respective two opposing passages 17. Here, portions of the first pair of adjacent zones 19 protrude above the position of the original slot 16'. Next, referring to FIG. 10c, a second pair of adjacent zones 19 are stretched after the fasteners 8 are inserted into the respective two opposing passages 17. Here, the second pair of zones overlaps the first pair. This configuration fixes the airbag 6 to the gas generator 7 and seals (by the overlapping of the zones), while allowing access to the cutout 18A for connecting the ignition cable 12 to the connection 21.

This connecting method for the airbag can be used, not only for an airbag module, but also for connecting airbags to gas generators. The present method is simple and reliable, while eliminating the need for retaining rings or other fastening devices. Only corresponding threaded bolts, screws, or other fasteners that can be passed through the airbag through the openings in the region of the slot for the gas generator are needed.

The present housing encloses the gas generator and the airbag. In particular, the cover 5C surrounds the airbag 6 and the gas generator 7 on all sides with its side walls 5W, so that no additional housing parts are required to hold and enclose the airbag and the gas generator. Of course, however, openings may be provided through the housing, for example, to feed an ignition cable to the gas generator or to access from the outside to the interior of the cover for other reasons.

The housing can be made of plastic, with the hinge formed of a film type, which is well known. The housing can be formed by an injection molding. The housing can be produced in a two- or three-component technique, so that the properties of the plastics can be optimally configured to the individual regions of the housing. The visible surface may therefore have a decor corresponding, for example, to the interior trim of the vehicle. A flexible plastic can be used in the region of the hinge.

Depending on the geometry of the airbag module or of the vehicle part into or onto which the module is fitted, one, two, three, or four tabs can be used. For example, for fitting an airbag module into a three-spoke steering wheel, three tabs can form the generator support. The tabs can also overlap one another. The final fixing of the parts of the airbag module to one another expediently takes place when the module is fastened to the steering wheel. This eliminates any further fastening components, such as rivets or screws. The airbag can be fixed to the gas generator, wedged between the tabs and the gas generator. It is also expedient to place the airbag around the generator support, i.e., around the housing instead.

The slot-shaped opening can form at least two zones on the airbag. The slot-shaped opening can form an even number of zones. The cross slot-shaped opening can be used to form four zones.

To install the airbag module, the gas generator is placed into the airbag, and subsequently, to fix the airbag to the gas generator, two first opposing passages can be threaded over the fasteners, followed by the two remaining passages. The zones formed by the slot thus overlap. The sensor can be connected to the generator through the cutout provided in the generator support. The airbag is tightly and securely clamped between the gas generator and the gas generator support when the fasteners are secured to the steering wheel.

The threaded fasteners permit a very easy adaptation to different types of steering wheel. To install the airbag module, only corresponding holes need to be provided in the steering-wheel frame or hub for holding the airbag module in the steering wheel (for example, in the contact bridge in the case of a "floating horn").

The assembly of the airbag module itself is also considerably simplified according to the present invention. The gas generator is placed into the airbag and the airbag is then folded directly over the cover. The generator support, which is formed, for example, by two tabs on the housing, is then placed onto the gas generator, for example along a film hinge, and secured, preferably via latches. The final fixing then takes place as the airbag module is being installed on a vehicle part.

As an alternative, the airbag may also be folded in an auxiliary container and/or a place-holder may be provided instead of the gas generator during its folding stage.

The visible regions of the housing can be covered with leather, fabric, or film, or to push the airbag module under a corresponding lining, for example for the entire steering wheel.

The disclosures of the parent application, PCT/DE99/04030, and its priority application, DE 199 05 025.2, in their entirety, including the drawings, claims, and the specification thereof, are incorporated herein by reference.

We claim:

1. An airbag module, comprising:
    an airbag mount for mounting a gas generator to an airbag, the mount including a slot for completely inserting the gas generator into the airbag, and a plurality of passages for receiving fasteners for securing the airbag module,
    wherein the slot forms at least two mounting zones;
    wherein the passages are provided in the mounting zones,
    wherein the mounting zones are configured to partially overlap when the fasteners are inserted through the passages,
    wherein the mounting zones of the airbag overlap exclusively, being stretched after inserting fasteners, and
    wherein the airbag mount further includes a cutout for passage of an ignition cable, the cutout being formed between the overlapping zones.

2. An airbag module according to claim 1, further comprising:

a single-piece housing having a cover and a generator support;

wherein the airbag is folded and positioned inside the housing; and wherein the gas generator is connected to the generator support, and wherein the generator support is foldably connected to the cover.

3. An airbag module according to claim 1, wherein part of the gas generator rests on the generator support.

4. An airbag module according to claim 1, wherein the generator support is hingedly connected to the cover.

5. An airbag module according to claim 4, wherein the generator support is hinged to the cover with at least one film hinge.

6. An Airbag module according to claim 4, wherein the generator support comprises at least one foldable tab hingedly connected to the cover.

7. An airbag module according to claim 6, wherein the housing is made of plastic.

8. An airbag module according to claim 6, wherein the housing is made of an injected molded plastic.

9. An airbag module according to claim 6, wherein the generator support comprises at least two tabs that overlap each other.

10. An airbag module according to claim 9, wherein the housing includes latches for securing the tabs to the cover.

11. An airbag module according to claim 1, wherein the gas generator has a flange for securing the gas generator to the generator support.

12. An airbag module according to claim 11, wherein the flange further includes fasteners for connecting the airbag module to a steering wheel.

13. An airbag module according to claim 12, wherein the fasteners are threaded bolts.

14. An airbag module according to claim 1, wherein the airbag is fixed directly to the gas generator.

15. An airbag module according to claim 14, wherein the airbag is sandwiched between the generator support and the gas generator.

16. An airbag module according to claim 15, wherein the airbag has a slot for inserting the gas generator into the airbag.

17. An airbag module according to claim 16, wherein the slot is cross shaped.

18. An airbag module according to claim 16, wherein the airbag has passages for fasteners for securing the airbag module to a steering wheel adjacent to the slot.

19. An airbag module according to claim 1, wherein the slot forms an even number of the mounting zones.

20. An airbag module according to claim 19, wherein the slot is cross shaped.

21. An airbag module according to claim 1, wherein the passages are punched holes.

22. An airbag module according to claim 1, wherein the passages each have an reinforced edge.

23. A method of mounting an airbag for an airbag module, comprising the steps of:

providing an airbag with a slot that forms at least two mounting zones, and a plurality of passages in the two mounting zones;

providing a single-piece housing having a cover and a generator support foldably connected to the cover, the generator support having openings for passage of fasteners;

positioning the folded airbag inside the cover;

providing a gas generator with the fasteners and inserting the gas generator completely into the airbag through the slot;

inserting the fasteners through the passages such that the mounting zones are being stretched and partially overlap; and folding the generator support onto the gas generator positioned inside the cover and inserting the fasteners through the openings.

24. A method according to claim 23, wherein the slot is cross shaped, and wherein the number of passages is four, providing four mount zones, each zone having one of the passages.

* * * * *